United States Patent
Masuda

(10) Patent No.: US 11,769,606 B2
(45) Date of Patent: Sep. 26, 2023

(54) CONDUCTIVE METAL PASTE

(71) Applicant: Nisshinbo Holdings Inc., Tokyo (JP)

(72) Inventor: Gen Masuda, Chiba (JP)

(73) Assignee: NISSHINBO HOLDINGS INC., Tokyo (JP)

(*) Notice: Subject to any disclaimer, the term of this patent is extended or adjusted under 35 U.S.C. 154(b) by 32 days.

(21) Appl. No.: 17/598,995

(22) PCT Filed: Mar. 29, 2019

(86) PCT No.: PCT/JP2019/014091
§ 371 (c)(1),
(2) Date: Sep. 28, 2021

(87) PCT Pub. No.: WO2020/202280
PCT Pub. Date: Oct. 8, 2020

(65) Prior Publication Data
US 2022/0172858 A1    Jun. 2, 2022

(51) Int. Cl.
*H01B 1/22* (2006.01)
*C09D 5/24* (2006.01)

(52) U.S. Cl.
CPC .................. *H01B 1/22* (2013.01); *C09D 5/24* (2013.01)

(58) Field of Classification Search
CPC ............ H01B 1/00; H01B 1/22; C09D 5/24
See application file for complete search history.

(56) References Cited

U.S. PATENT DOCUMENTS

| 2011/0233458 A1* | 9/2011 | Texter ................ H01B 1/20 977/932 |
| 2016/0137865 A1* | 5/2016 | Kwon .................. C09D 11/52 252/514 |
| 2018/0061519 A1 | 3/2018 | Abe et al. |
| 2019/0127403 A1 | 5/2019 | Masuda |
| 2022/0025201 A1* | 1/2022 | Sun ..................... C09D 11/03 |

FOREIGN PATENT DOCUMENTS

| JP | 2006-335995 A | 12/2006 |
| JP | 2014-114420 A | 6/2014 |
| JP | 2017-73365 A | 4/2017 |
| JP | 2018-35286 A | 3/2018 |
| WO | 2015/174399 A1 | 11/2015 |
| WO | 2017/183342 A1 | 10/2017 |

OTHER PUBLICATIONS

English language translation of JP 2006-335995 (pub date Dec. 2006).*
Safavi et al. "Metal paste nanocomposite electrodes as a new generation of metallic electrodes", Anal. Chem. 2011, 83, 55-2-5510.*
International Search Report dated Jun. 18, 2019, issued in counterpart International Application No. PCT/JP2019/014091 (4 pages).
Office Action dated Sep. 14, 2021, issued in counterpart JP Application No. 2018-023062, with machine translation. (5 pages).
Office Action dated Apr. 5, 2022, issued in counterpart to JP Application No. 2018-023062, with English Translation. (3 pages).

* cited by examiner

Primary Examiner — Mark Kopec
(74) Attorney, Agent, or Firm — WHDA, LLP

(57) ABSTRACT

The purpose of the present invention is to provide a conductive metal paste having improved conductivity without increasing the amount of a conductive filler to be added. The conductive metal paste contains a metal filler and less than 1 mass % of an ionic liquid, and does not contain carbon nanotubes.

4 Claims, No Drawings

CONDUCTIVE METAL PASTE

TECHNICAL FIELD

The present invention relates to a conductive metal paste.

BACKGROUND ART

A conductive paste is obtained by dispersing a conductive material in a resin or the like to form a paste, and is widely used for forming an electric circuit such as a printed wire and bonding electronic components. In the conductive paste, metal particles such as silver particles, or a conductive carbon material is used as a conductive filler. Examples of the method for improving the conductivity of a conductive paste include increasing the amount of a conductive filler added, but for example, a silver paste has a cost problem because silver is expensive. In addition, a conductive paste containing carbon nanotubes (CNTs) as a conductive filler has been reported (Patent Document 1 etc.), but CNTs are also expensive, and there is a cost problem.

PRIOR ART DOCUMENTS

Patent Documents

Patent Document 1: JP-A 2014-114420

SUMMARY OF INVENTION

Technical Problem

The present invention has been made in view of the above-described circumstances, and an object of the present invention is to provide a conductive metal paste having improved conductivity without increasing the amount of a conductive filler added.

Solution to Problem

The present inventor has extensively conducted studies for achieving the above-described object, and resultantly found that when an ionic liquid is added at a concentration of less than 1 wt % to a conductive metal paste which contains a metal filler and is free of CNTs, the specific resistance of the conductive metal paste can be reduced to improve conductivity. Consequently, the present inventor has completed the present invention.

That is, the present invention provides the following conductive metal paste.

1. A conductive metal paste which contains a metal filler and an ionic liquid at less than 1 wt % and is free of CNTs.
2. The conductive metal paste according to 1, wherein the metal filler is silver.
3. The conductive metal paste according to 1 or 2, further comprising a binder.
4. The conductive metal paste according to any one of 1 to 3, wherein the cation forming the ionic liquid is a nitrogen atom-containing cation or a phosphorus atom-containing cation.
5. The conductive metal paste according to 4, wherein the cation forming the ionic liquid is a cation having any of the following formulae (1) to (4):

[Chem. 1]

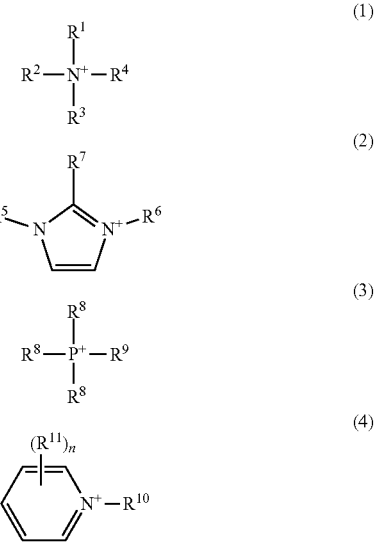

wherein $R^1$ to $R^4$ each independently represent an alkyl group having 1 to 20 carbon atoms or an alkoxyalkyl group having $-(CH_2)_k-OR$, where any two of $R^1$ to $R^4$ are optionally bonded to each other to form a ring together with a nitrogen atom to which these groups are bonded, or any two of $R^1$ to $R^4$ are optionally bonded to each other to form a ring together with a nitrogen atom to which these groups are bonded, with the other two groups being bonded to each other to form a spiro ring having a nitrogen atom as a spiro atom; $R^5$ and $R^6$ are each independently an alkyl group having 1 to 20 carbon atoms or an alkoxyalkyl group having $-(CH_2)_k-OR$; $R^7$ is a hydrogen atom, a methyl group or an ethyl group; $R^8$ is an alkyl group having 1 to 20 carbon atoms; $R^9$ is an alkyl group having 1 to 20 carbon atoms, or an alkoxyalkyl group having $-(CH_2)_k-OR$; $R^{10}$ is an alkyl group having 1 to 8 carbon atoms, or an alkoxyalkyl group having $-(CH_2)_k-OR$; $R^{11}$ is an alkyl group having 1 to 4 carbon atoms; n is an integer of 0 to 5; R is a methyl group or an ethyl group; and k is 1 or 2.

6. The conductive metal paste according to any one of 1 to 5, wherein an anion forming the ionic liquid is a fluorine atom-containing anion, an alkane sulfonate anion, an aromatic sulfonate anion, an alkyl sulfate anion, an alkyl phosphate anion, an alkyl phosphonate anion or a trialkylsilyl alkanesulfonate anion.

7. A conductivity improving agent for conductive metal paste comprising an ionic liquid containing a nitrogen atom-containing cation or a phosphorus atom-containing cation, and a fluorine atom-containing anion, an alkane sulfonate anion, an aromatic sulfonate anion, an alkyl sulfate anion, an alkyl phosphate anion, an alkyl phosphonate anion or a trialkylsilyl alkanesulfonate anion.

8. A method for reducing the specific resistance of a conductive metal paste, comprising adding an ionic liquid at a concentration of less than 1 wt % to a conductive metal paste which contains a metal filler and is free of CNTs.

9. The method according to 8, wherein the ionic liquid contains a nitrogen atom-containing cation or a phosphorus atom-containing cation, and a fluorine atom-containing anion, an alkane sulfonate anion, an aromatic sulfonate anion, an alkyl sulfate anion, an alkyl phosphate anion, an alkyl phosphonate anion or a trialkylsilyl alkanesulfonate anion.

Advantageous Effects of Invention

The conductive metal paste of the present invention has improved conductivity without increasing the amount of a conductive filler added, and is advantageous in terms of cost.

DESCRIPTION OF EMBODIMENTS

The conductive metal paste of the present invention contains a metal filler and an ionic liquid at less than 1 wt %, and is free of CNTs.

[Metal Filler]

Examples of the material of the metal filler include silver, gold, copper, aluminum, magnesium, nickel, iron and alloys thereof. Of these, silver is preferable from the viewpoint of conductivity. The metal filler may be one in which the surfaces of certain metal particles are covered with another metal.

The shape of the metal filler is not particularly limited, and examples thereof include a spherical shape, a dendritic shape, a flake shape and an irregular shape. The mean particle size of the metal filler is not particularly limited, and is, for example, about 0.01 to 50 μm. In the present invention, the mean particle size is a cumulative volume diameter at 50% in a particle size distribution measured by a laser diffraction/scattering method using a particle size distribution measuring apparatus.

The content of the metal filler is not particularly limited, and is preferably 40 to 95 wt %, more preferably 60 to 90 wt % in the conductive metal paste.

[Ionic Liquid]

The ionic liquid contained in the conductive metal paste of the present invention is not particularly limited, and previously known ionic liquids can be used.

The cation forming the ionic liquid is not particularly limited, and is preferably a nitrogen atom-containing cation or a phosphorus atom-containing cation, and specifically, a quaternary ammonium ion, a quaternary phosphonium ion, an imidazolium ion, a pyridinium ion, a pyrrolidinium ion, a piperidinium ion or the like is preferable.

Of these cations, those represented by any of the following formulae (1) to (4) are particularly preferable.

[Chem. 2]

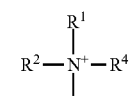

(1)

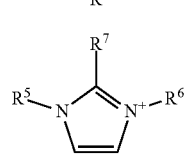

(2)

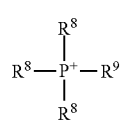

(3)

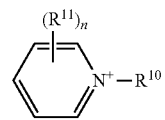

(4)

In the formula (1), $R^1$ to $R^4$ are each independently an alkyl group having 1 to 20 carbon atoms or an alkoxyalkyl group represented by $-(CH_2)_k-OR$. R is a methyl group or an ethyl group; and k is 1 or 2.

The alkyl group having 1 to 20 carbon atoms may be linear, branched or cyclic, and examples thereof include a methyl group, an ethyl group, an n-propyl group, an isopropyl group, a cyclopropyl group, an n-butyl group, a sec-butyl group, an isobutyl group, a tert-butyl group, a cyclobutyl group, an n-pentyl group, a cyclopentyl group, an n-hexyl group, a cyclohexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group and an n-eicosyl group. In particular, $R^1$ to $R^4$ are each preferably an alkyl group having 1 to 3 carbon atoms, more preferably a linear alkyl group having 1 to 3 carbon atoms, still more preferably a methyl group or an ethyl group.

Examples of the alkoxyalkyl group include a methoxymethyl group, an ethoxymethyl group, a methoxyethyl group and an ethoxyethyl group. Of the alkoxyalkyl groups, a methoxyethyl group or an ethoxyethyl group is preferable.

Any two of $R^1$ to $R^4$ are optionally bonded to each other to form a ring together with a nitrogen atom to which these groups are bonded. Examples of the ring formed by bonding any two of $R^1$ to $R^4$ include an aziridine ring, an azetidine ring, a pyrrolidine ring, a piperidine ring, an azepane ring, an imidazolidine ring, a pyridine ring, a pyrrole ring, an imidazole ring and a quinol ring. A pyrrolidine ring, a piperidine ring, an imidazolidine ring, a pyridine ring, a pyrrole ring, an imidazole ring, a quinol ring and the like are preferable, and a pyrrolidine ring, an imidazolidine ring and the like are more preferable. Further, any two of $R^1$ to $R^4$ are optionally bonded to each other to form a ring together with a nitrogen atom to which these groups are bonded, with the other two groups being bonded to each other to form a spiro ring having a nitrogen atom as a spiro atom. The spiro ring is particularly preferably a 1,1'-spirobipyrrolidine ring.

Specific examples of the nitrogen atom-containing cation represented by the formula (1) include quaternary ammonium ions represented by the following formula (1-1) or (1-2) and pyrrolidinium ions represented by the following formula (1-3) or (1-4).

[Chem. 3]

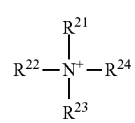

(1-1)

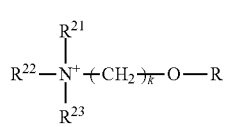

(1-2)

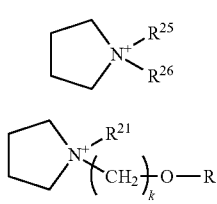

(1-3)

(1-4)

In the formulae (1-1) to (1-4), R and k are the same as described above. $R^{21}$ to $R^{24}$ are each independently an alkyl group having 1 to 20 carbon atoms. $R^{25}$ and $R^{26}$ are each independently an alkyl group having 1 to 20 carbon atoms. In addition, $R^{25}$ and $R^{26}$ are optionally bonded to each other to form a ring together with a nitrogen atom to which these groups are bonded. Examples of the alkyl group having 1 to 20 carbon atoms include the same groups as those described above. In particular, $R^{21}$ to $R^{26}$ are each preferably an alkyl group having 1 to 3 carbon atoms, more preferably a linear alkyl group having 1 to 3 carbon atoms, still more preferably a methyl group or an ethyl group.

The cation represented by the formula (1) is preferably an N,N-diethyl-N-methyl-N-2-methoxyethylammonium cation, an N,N-diethyl-N-methyl-N-2-methoxymethylammonium cation, an N-ethyl-N,N-dimethyl-N-2-methoxyethylammonium cation, an N-ethyl-N,N-dimethyl-N-2-methoxymethylammonium cation, an N-methyl-N-2-methoxyethylpyrrolidinium cation, an N-ethyl-N-2-methoxyethylpyrrolidinium cation, an N-methyl-N-2-methoxymethylpyrrolidinium cation, an N-ethyl-N-2-methoxymethylpyrrolidinium cation, an N-methyl-N-2-methoxyethylpiperidinium cation and an N-methyl-N-2-ethoxyethylpiperidinium cation.

In the formula (2), $R^5$ and $R^6$ are each independently an alkyl group having 1 to 20 carbon atoms or an alkoxyalkyl group represented by -$(CH_2)_k$-OR. R and k are the same as described above. Examples of the alkyl group having 1 to 20 carbon atoms and the alkoxyalkyl group include the same groups as those described above. In particular, each of $R^5$ and $R^6$ is preferably an alkyl group having 1 to 20 carbon atoms, more preferably an alkyl group having 1 to 4 carbon atoms, still more preferably a linear alkyl group having 1 to 4 carbon atoms, furthermore preferably a methyl group, an ethyl group or a butyl group. It is preferable that one of $R^5$ and $R^6$ is a methyl group, and the other is a different group.

In the formula (2), $R^7$ is a hydrogen atom, a methyl group or an ethyl group, preferably a hydrogen atom or a methyl group.

The cation represented by the formula (2) is preferably a 1-ethyl-3-methylimidazolium cation, a 1-methyl-3-propylimidazolium cation, a 1-butyl-3-methylimidazolium cation, a 1-(2-methoxyethyl)-3-methylimidazolium cation, a 1-methoxymethyl-3-methylimidazolium cation, a 1-ethyl-3-(2-methoxyethyl)imidazolium cation, a 1-(2-ethoxyethyl)-3-ethylimidazolium cation, a 1-ethyl-3-methylimidazolium cation or the like.

In the formula (3), $R^8$ is an alkyl group having 1 to 20 carbon atoms. The alkyl group having 1 to 20 carbon atoms may be linear, branched or cyclic, and examples thereof include an n-pentyl group, a cyclopentyl group, an n-hexyl group, a cyclohexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group and an n-eicosyl group in addition to the alkyl groups having 1 to 4 carbon atoms.

In the formula (3), $R^9$ is an alkyl group having 1 to 20 carbon atoms, or an alkoxyalkyl group represented by -$(CH_2)_k$-OR. R and k are the same as described above. Examples of the alkyl group having 1 to 20 carbon atoms include the same groups as those described above.

Of the cations represented by the formula (3), those in which $R^9$ is represented by -$(CH_2)_k$-OR, or those in which $R^8$ and $R^9$ are alkyl groups different from each other are preferable. When $R^8$ and $R^9$ are alkyl groups different from each other, the difference in the number of carbon atoms is preferably 1 or more, more preferably 3 or more, still more preferably 5 or more.

The cation represented by the formula (3) is preferably a tributyldodecylphosphonium cation, a tributylhexadecylphosphonium cation, a trihexyltetradecylphosphonium cation or the like.

In the formula (4), $R^{10}$ is an alkyl group having 1 to 8 carbon atoms, or an alkoxyalkyl group represented by -$(CH_2)_k$-OR. R and k are the same as described above. $R^{11}$ is an alkyl group having 1 to 4 carbon atoms; n is an integer of 0 to 5.

The alkyl group having 1 to 4 carbon atoms may be linear, branched or cyclic, and examples thereof include a methyl group, an ethyl group, an n-propyl group, an isopropyl group, a cyclopropyl group, an n-butyl group, a sec-butyl group, an isobutyl group, a tert-butyl group and a cyclobutyl group. The alkyl group having 1 to 8 carbon atoms may be linear, branched or cyclic, and examples thereof include an n-pentyl group, an n-hexyl group, an n-heptyl group, an n-octyl group, a cyclopentyl group and a cyclohexyl group in addition to the alkyl groups having 1 to 4 carbon atoms. Examples of the alkoxyalkyl group include the same groups as those described above.

In particular, $R^{10}$ is preferably a linear alkyl group having 1 to 4 carbon atoms or the alkoxyalkyl group, more preferably the alkoxyalkyl group, still more preferably a methoxymethyl group or a methoxyethyl group. $R^{11}$ is preferably a linear alkyl group having 1 to 4 carbon atoms. n is preferably 0 or 1.

The cation represented by the formula (4) is preferably a 3-methyl-N-butylpyridinium cation, an N-butylpyridinium cation, an N-2-methoxyethylpyridinium cation, an N-2-methoxymethylpyridinium cation, or the like.

The anion forming the ionic liquid is not particularly limited, and examples thereof include fluorine atom-containing anions, alkane sulfonate anions, aromatic sulfonate anions, alkyl sulfate anions, carboxylate anions, alkyl phosphate anions, alkyl phosphonate anions, trialkylsilyl alkanesulfonate anions, trialkylsilyl alkylsulfate anions and trialkylsilyl alkylphosphate anions.

Examples of the fluorine atom-containing anion include $BF_4^-$, $CF_3SO_3^-$, $CF_3CO_2^-$, $PF_6^-$, $(C_4F_9SO_2)_2N^-$, $(C_3F_7SO_2)_2N^-$, $(C_2F_5SO_2)_2N^-$, $(C_2F_5SO_2)(CF_3SO_2)N^-$, $(CF_3SO_2)_2N^-$, $(CF_3SO_2)(FSO_2)N^-$ and $(FSO_2)_2N^-$. The fluorine atom-containing anion is preferably an amide anion having a fluorine atom, particularly preferably $(CF_3SO_2)_2N^-$ or $(FSO_2)_2N^-$.

The alkane sulfonate anion is preferably one having 1 to 8 carbon atoms, and specific examples thereof include $CH_3SO_3^-$, $C_2H_5SO_3^-$, $C_3H_7SO_3^-$ and $C_4H_9SO_3^-$. The aromatic sulfonate anion is preferably one having 6 to 10 carbon atoms, and specific examples thereof include $PhSO_3^-$, $p$-$CH_3PhSO_3^-$ and $p$-$C_2H_5PhSO_3^-$. The alkyl sulfate anion preferably has 1 to 8 carbon atoms, and specific examples thereof include $CH_3SO_4^-$, $C_2H_5SO_4^-$, $C_3H_7SO_4^-$ and $C_4H_9SO_4^-$. The alkane sulfonate anion and the alkyl sulfate anion are each more preferably one having 1 to 4 carbon atoms. The aromatic sulfonate anion is more preferably one having 6 to 8 carbon atoms.

The carboxylate anion is preferably one having 1 to 4 carbon atoms, and specific examples thereof include $HCO_2^-$, $CH_3CO_2^-$, $C_2H_5CO_2^-$, and $C_3H_7CO_2^-$. Examples of the alkyl phosphate anion and alkyl phosphonate anion include those represented by $(R^{31}O)(R^2)PO_2^-$. Here, $R^3$ is an alkyl group having 1 to 8 carbon atoms, and is preferably an alkyl group having 1 to 4 carbon atoms. $R^{32}$ is a hydrogen atom, or an alkyl group or alkoxy group having 1 to 8 carbon atoms, and is preferably a hydrogen atom, a methyl group or a methoxy group.

Examples of the trialkylsilyl alkanesulfonate anion include trimethylsilyl ethanesulfonate anions and trimethylsilyl propanesulfonate anions. Examples of the trialkylsilyl alkylsulfate anion include trimethylsilyl ethylsulfate anions and trimethylsilyl propylsulfate anions. Examples of the trialkylsilyl alkylphosphate anion include those represented by $(R^{41}O)(R^{42}O)PO_2^-$. Here, $R^{41}$ is a trialkylsilylalkyl group such as a trimethylsilylethyl group or a trimethylsilylpropyl group. $R^{42}$ is a hydrogen atom or an alkyl group having 1 to 8 carbon atoms, and is preferably a hydrogen atom or a methyl group.

In particular, the anion forming the ionic liquid is preferably a fluorine atom-containing anion, an alkane sulfonate anion, an aromatic sulfonate anion, an alkyl sulfate anion, an alkyl phosphate anion, an alkyl phosphonate anion or a trialkylsilyl alkanesulfonate anion, more preferably a fluorine atom-containing anion, an alkane sulfonate anion, an alkyl sulfate anion or a trialkylsilyl alkanesulfonate anion.

The ionic liquid is particularly preferably one containing a cation represented by any of the formulae (1) to (3) and a fluorine atom-containing anion, an alkane sulfonate anion, an aromatic sulfonate anion, an alkyl sulfate anion, an alkyl phosphate anion, an alkyl phosphonate anion or a trialkylsilyl alkanesulfonate anion, more preferably one containing a cation represented by any of the formulae (1) to (3) and a fluorine atom-containing anion, an alkane sulfonate anion, an alkyl sulfate anion or a trialkylsilyl alkanesulfonate anion, still more preferably one containing a cation represented by the formula (1) or (2) and an alkane sulfonate anion, a fluorine atom-containing anion or an alkyl sulfate anion.

Examples of the ionic liquid that can be suitably used in the present invention include N-2-methoxyethyl-N-methylpyrrolidinium bis(trifluoromethanesulfonyl)amide (MEMP.TFSA), N-2-methoxyethyl-N-methylpyrrolidinium bis(fluorosulfonyl)amide (MEMP.FSA), N-2-methoxyethyl-N-methylpyrrolidinium trifluoromethanesulfonate (MEMP.CF$_3$SO$_3$), N-2-methoxyethyl-N-methylpyrrolidinium tetrafluoroborate (MEMP.BF$_4$), N-2-methoxyethyl-N-methylpyrrolidinium methanesulfonate (MEMP.MeSO$_3$), N-2-methoxyethyl-N-methylpyrrolidinium butanesulfonate (MEMP.BuSO$_3$), N,N-diethyl-N-2-methoxyethyl-N-methylammonium bis(trifluoromethanesulfonyl)amide (DEME.TFSA), N,N-diethyl-N-2-methoxyethyl-N-methylammonium bis(fluorosulfonyl)amide (DEME.FSA), N,N-diethyl-N-2-methoxyethyl-N-methylammonium methanesulfonate (DEME.MeSO$_3$), N,N-diethyl-N-2-methoxyethyl-N-methylammonium butanesulfonate (DEME.BuSO$_3$), N,N-diethyl-N-2-methoxyethyl-N-methylammonium hexafluorophosphate (DEME.PF$_6$), 1-ethyl-3-methylimidazolium bis(trifluoromethanesulfonyl)amide (EMI.TFSA), 1-ethyl-3-methylimidazolium bis(fluorosulfonyl)amide (EMI.FSA), 1-ethyl-3-methylimidazolium tetrafluoroborate (EMI.BF$_4$), 1-ethyl-3-methylimidazolium methanesulfonate (EMI.MeSO$_3$), 1-ethyl-3-methylimidazolium butanesulfonate (EMI.BuSO$_3$), 1-ethyl-3-methylimidazolium ethanesulfate (EMI.EtSO$_4$), 1-butyl-3-methylimidazolium bis(trifluoromethanesulfonyl)amide (BMI.TFSA), 1-butyl-3-methylimidazolium bis(fluorosulfonyl)amide (BMI.FSA), 1-butyl-3-methylimidazolium methanesulfonate (BMI.MeSO$_3$), 1-butyl-3-methylimidazolium butanesulfonate (BMI.BuSO$_3$), 1-hexyl-3-methylimidazolium bis(trifluoromethanesulfonyl)amide (HMI.TFSA), 1-hexyl-3-methylimidazolium bis(fluorosulfonyl)amide (HMI.FSA), tributyldodecylphosphonium bis(trifluoromethanesulfonyl)amide (BDDP.TFSA), tributyldodecylphosphonium bis(fluorosulfonyl)amide (BDDP.FSA), tributyldodecylphosphonium 3-(trimethylsilyl)-1-propanesulfonate (BDDP.DSS), tributyldodecylphosphonium 2-(trimethylsilyl)-1-ethanesulfonate (BDDP.TMSES), tributyldodecylphosphonium butanesulfonate (BDDP.BuSO$_3$), tributylhexadecylphosphonium bis(trifluoromethanesulfonyl)amide (BHDP.TFSA), tributylhexadecylphosphonium bis(fluorosulfonyl)amide (BHDP.FSA), tributylhexadecylphosphonium 3-(trimethylsilyl)-1-propanesulfonate (BHDP.DSS), tributylhexadecylphosphonium 2-(trimethylsilyl)-1-ethanesulfonate (BHDP.TMSES), tributylhexadecylphosphonium butanesulfonate (BHDP.BuSO$_3$), trihexyltetradecylphosphonium bis(trifluoromethanesulfonyl)amide, trihexyltetradecylphosphoniumbutane bis(fluorosulfonyl)amide, and trihexyltetradecylphosphonium butanesulfonate.

The content of the ionic liquid is less than 1 wt % in the conductive metal paste of the present invention, and the upper limit thereof is preferably 0.75% wt % or less, more preferably 0.50 wt % or less, still more preferably 0.25 wt % or less. On the other hand, the lower limit thereof is preferably 0.01 wt % or more, more preferably 0.02 wt % or more, still more preferably 0.03 wt % or more.

[Other Components]

The conductive metal paste of the present invention may contain a binder. As the binder, one that has been heretofore known as a binder used for a conductive metal paste can be used. Examples of the binder that can be suitably used in the present invention include epoxy resins, phenol resins, polyester resins, butyral resins, urethane resins, epoxy urethane resins, urea resins, acrylic resins, melamine resins, polyimide resins, polyamideimide resins and silicone resins. The content of the binder is not particularly limited as long as the effect of the present invention is not impaired.

A reactive diluent may be added to the conductive metal paste of the present invention if necessary for adjusting the viscosity. Examples of the reactive diluent include diglycidyl ethers such as ethylene glycol diglycidyl ether, 2-ethylhexyl glycidyl ether, glycidyl methacrylate, cyclohexane dimethanol diglycidyl ether, trimethylolpropane triglycidyl ether, neopentyl glycol diglycidyl ether, phenyl glycidyl ether, polyethylene glycol diglycidyl ether, and polypropylene glycol diglycidyl ether. The amount of the reactive diluent added is not particularly limited as long as the effect of the present invention is not impaired.

When the conductive metal paste of the present invention contains the binder, the reactive diluent, or both, a curing agent may be further added if necessary. The curing agent is not particularly limited as long as it can cure the binder or the reactive diluent, and examples thereof include phenol compounds, imidazole compounds, isocyanate compounds, acid anhydrides, amine compounds and amide compounds.

The amount of the curing agent added is not particularly limited as long as the effect of the present invention is not impaired.

The conductive metal paste of the present invention may be a solvent-free type, and may contain a solvent if necessary. The solvent is not particularly limited as long as it is used for conductive metal pastes, and a known solvent can be used. The amount of the solvent added is not particularly limited as long as the effect of the present invention is not impaired.

If necessary, the conductive metal paste of the present invention may contain additives known as additives for conductive metal pastes, such as a thixotropic imparting agent, a chelating agent, a rust inhibitor, a dispersant and an antifoaming agent. The amounts of these additives added are not particularly limited as long as the effect of the present invention is not impaired.

Examples of the method for producing the conductive metal paste of the present invention include a method in which the above-described components are added simultaneously or in any order, and kneaded. An example thereof is a method in which an ionic liquid is added at a predetermined concentration to a paste obtained by kneading a metal filler, a binder, and a solvent if necessary, and the mixture is further kneaded. The kneading method is not particularly limited, and may be a previously known method.

In addition, the above-described ionic liquid may be added at a predetermined concentration to a commercially available conductive metal paste free of CNT, followed by kneading the mixture. This enables reduction of the specific resistance of the conductive metal paste, i.e. improvement of the conductivity.

By coating or printing a substrate with the conductive metal paste of the present invention and then curing the paste by drying, baking or the like, an electric circuit can be formed or an electronic component can be bonded.

EXAMPLES

Examples and Comparative Examples are given below to illustrate the present invention further in detail, although the present invention is not limited by these Examples. DOTITE (registered trademark) FA-353N, DOTITE XA-910 and DOTITE XA-5617 which are the conductive metal pastes used are all manufactured by Fujikura Kasei Co., Ltd. The ionic liquid used is as follows.

[Chem. 4]

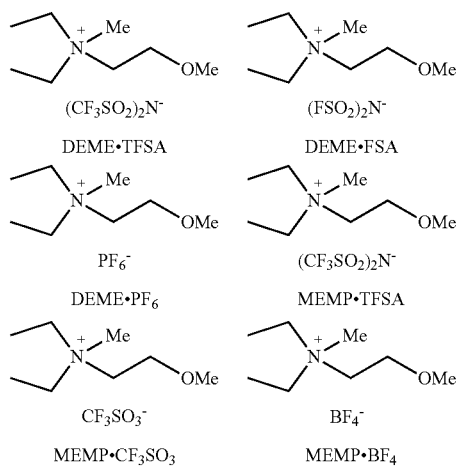

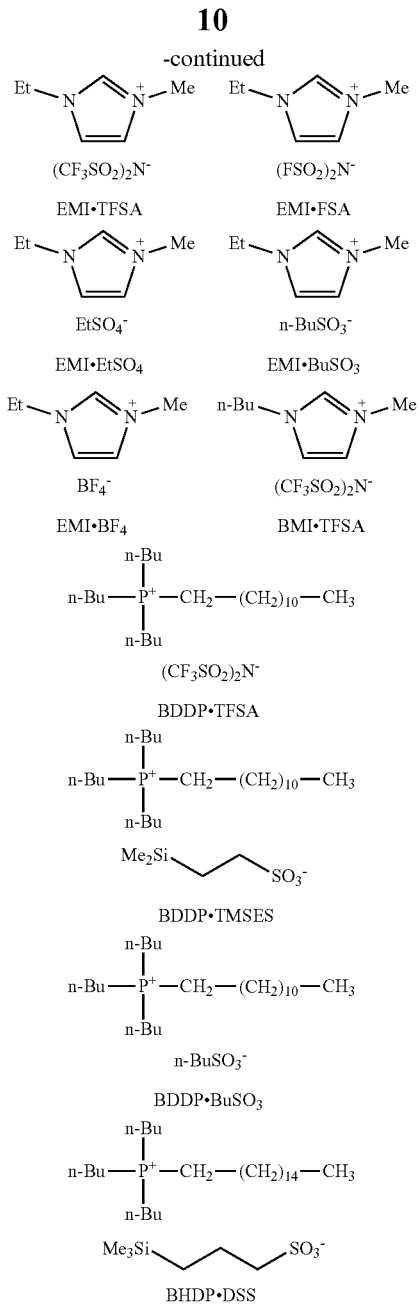

wherein Me, Et and n-Bu are a methyl group, an ethyl group and an n-butyl group, respectively.

$DEME.PF_6$ was synthesized according to the method described in WO 2002/076924. For $MEMP.CF_3SO_3$, a cation component was synthesized in accordance with the method described in WO 2002/076924, and a $CF_3SO_3$ salt was obtained in accordance with the method described in this publication. For DEME.FSA, a cation component was synthesized in accordance with the method described in WO 2002/076924, and a FSA salt was obtained in accordance with the method described in WO 2016/103906. BHDP.DSS was synthesized in accordance with the method described in WO 2013/005712A. BDDP.TMSES was synthesized in accordance with the method described in JP 2017-36234 A.

$EMI.BuSO_3$ was obtained by converting 1-ethyl-3-methylimidazolium chloride (manufactured by Toyo Gosei Co., Ltd.) into an aqueous solution of a corresponding hydroxide and acid with an anion-exchange resin, converting sodium 1-butanesulfonate (manufactured by Toyo Gosei Co., Ltd.) into an aqueous solution of a corresponding hydroxide and acid with a cation-exchange resin, neutralizing the aqueous solutions, and then distilling off water. BDDP.BuSO$_3$ was obtained by converting tributyldodecylphosphonium bromide (manufactured by Tokyo Chemical Industry Co., Ltd.) into an aqueous solution of a corresponding hydroxide and acid with an anion-exchange resin, converting sodium 1-butanesulfonate (manufactured by Toyo Gosei Co., Ltd.) into an aqueous solution of a corresponding hydroxide and acid with a cation-exchange resin, neutralizing the aqueous solutions, and then distilling off water.

Commercially available products (manufactured by Kanto Chemical Co., Inc.) were used for DEME.TFSA, MEMP.TFSA, MEMP.BF$_4$, EMI.TFSA, EMI.FSA, EMI.EtSO$_4$, BMI.TFSA and EMI.BF$_4$.

For BDDP.TFSA, a slightly excessive amount, in terms of molar ratio, of lithium bis(trifluoromethanesulfonyl)amide (manufactured by Kanto Chemical Co., Inc.) was mixed with a solution of tributyldodecylphosphonium bromide in water, and the mixture was reacted. The reaction product was stirred overnight, an organic layer obtained by separation into two layers was separated and taken, and washed with distilled water several times, and water was removed with a vacuum pump under heating to obtain the BDDP.TFSA.

Examples and Comparative Examples

The ionic liquid was weighed with a mortar placed on a Mettler balance, and the amount of the conductive paste required to obtain a predetermined content (wt %) of the ionic liquid was calculated. The amount of the conductive paste was added to the mortar that was still placed on the Mettler balance. The mortar was removed from the Mettler balance, the mixture was first lightly stirred with a spatula, and then stirred with a pestle for about 10 to 15 minutes while the mixture attached to the pestle was sometimes scraped off with the spatula until the ionic liquid came into uniformity with the conductive paste, and thus an ionic liquid-containing conductive paste was prepared.

A Kapton tape was bonded onto a glass plate (2 mm thick) to prepare a sample with frames of 5×30 mm. At least four frames were prepared per sample. The ionic liquid-containing conductive paste was placed in the frame using a spatula, and a conductive paste layer having a uniform thickness was formed in the frame by a casting method using a paddle portion of the spatula. A blank sample free of the ionic liquid (with only the conductive paste) was directly placed in the frame of the glass plate from the container using a spatula, and then cast as it was.

The glass plate in this state was placed on a hot plate, and then the heater was switched on and heated to a temperature set for each conductive paste. After reaching the set temperature, the glass plate was continuously heated for a predetermined time to perform baking treatment. Immediately after the predetermined time, the glass plate was removed from the hot plate. The set temperature of the conductive metal paste used and the baking time after reaching the set temperature are as follows.

TABLE 1

| Conductive metal paste | Set temperature (° C.) | Baking time (min) |
|---|---|---|
| DOTITE FA-353N | 150 | 30 |
| DOTITE XA-910 | 150 | 30 |
| DOTITE XA-5617 | 200 | 10 |

After the glass plate was removed from the hot plate and the temperature sufficiently decreased, the resistance value and the specific resistance value of the conductive paste layer were measured using a measuring apparatus (DL STAR-6P MCP-T610 manufactured by Mitsubishi Chemical Analytech Co., Ltd.). The thickness of the conductive paste layer used for calculating the specific resistance value was a value measured for each baked sample using a measurement microscope STM-6 (manufactured by Olympus Corporation).

The obtained specific resistance values are shown in Tables 2 to 4. The specific resistance value described is an average value for four or more duplicates prepared for each sample.

TABLE 2

| | Conductive metal paste | Ionic liquid | Ionic liquid content (wt %) | Specific resistance value ($\times 10^{-5}$ Ω · cm) |
|---|---|---|---|---|
| Comparative Example 1-1 | DOTITE FA-353N | — | 0 | 4.110 |
| Example 1-1 | | MEMP-TFSA | 0.1 | 2.115 |
| Example 1-2 | | MEMP-TFSA | 0.25 | 2.273 |
| Example 1-3 | | DEME-TFSA | 0.1 | 1.933 |
| Example 1-4 | | DEME-TFSA | 0.5 | 2.408 |

TABLE 3

| | Conductive metal paste | Ionic liquid | Ionic liquid content (wt %) | Specific resistance value ($\times 10^{-5}$ Ω · cm) |
|---|---|---|---|---|
| Comparative Example 2-1 | DOTITE XA-910 | — | 0 | 6.529 |
| Example 2-1 | | DEME-TFSA | 0.1 | 3.873 |

TABLE 4

| | Conductive metal paste | Ionic liquid | Ionic liquid content (wt %) | Specific resistance value ($\times 10^{-4}$ Ω · cm) |
|---|---|---|---|---|
| Comparative Example 3-1 | DOTITE XA-5617 | — | 0 | 4.193 |
| Example 3-1 | | MEMP-TFSA | 0.05 | 7.851 |
| Example 3-2 | | DEME-TFSA | 0.05 | 3.088 |
| Example 3-3 | | EMI-TFSA | 0.05 | 2.940 |
| Example 3-4 | | MEMP-TFSA | 0.1 | 1.394 |
| Example 3-5 | | EMI-FSA | 0.1 | 7.123 |
| Example 3-6 | | EMI-BuSO$_3$ | 0.1 | 7.123 |
| Example 3-7 | | EMI-TFSA | 0.1 | 2.259 |
| Example 3-8 | | EMI-BF$_4$ | 0.1 | 2.365 |
| Example 3-9 | | BDDP-BuSO$_3$ | 0.1 | 2.597 |
| Example 3-10 | | MEMP-BF$_4$ | 0.1 | 2.639 |
| Example 3-11 | | DEME-FSA | 0.1 | 2.641 |
| Example 3-12 | | EMI-EtSO$_4$ | 0.1 | 2.647 |
| Example 3-13 | | BHDP-DSS | 0.1 | 2.718 |
| Example 3-14 | | BDDP-TFSA | 0.1 | 2.739 |

TABLE 4-continued

| | Conductive metal paste Ionic liquid | Ionic liquid content (wt %) | Specific resistance value (×10⁻⁴ Ω·cm) |
|---|---|---|---|
| Example 3-15 | DEME-TFSA | 0.1 | 2.759 |
| Example 3-16 | BDDP-TMSES | 0.1 | 2.884 |
| Example 3-17 | MEMP-CF$_3$SO$_3$ | 0.1 | 3.026 |
| Example 3-18 | BMI-TFSA | 0.1 | 3.317 |
| Example 3-19 | DEME-PF$_6$ | 0.1 | 3.652 |
| Example 3-20 | EMI-TFSA | 0.2 | 2.659 |
| Example 3-21 | MEMP-TFSA | 0.2 | 2.945 |
| Example 3-22 | DEME-TFSA | 0.2 | 2.841 |

It is evident from Table 2 to 4 that in any conductive paste, the specific resistance value was significantly lower when any of various ionic liquids was added than when the ionic liquid was not added.

Addition of an excessive amount of any of various ionic liquids, e.g. addition of the ionic liquid at 1 wt % or more, resulted in exhibition of properties unsuitable as a conductive paste such that deposition was not adequately performed because coating unevenness occurred during deposition or the conductive paste aggregated (not shown in the table).

The invention claimed is:

1. A conductive metal paste which contains a metal filler and an ionic liquid at less than 1 wt % and is free of carbon nanotubes,
   wherein a cation forming the ionic liquid is a nitrogen atom-containing cation represented by the following formula (1-2) or (1-4), or a phosphorus atom-containing cation represented by the following formula (3):

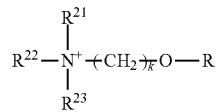 (1-2)

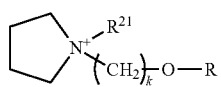 (1-4)

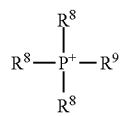 (3)

wherein $R^{21}$ to $R^{23}$ are each independently an alkyl group having 1 to 20 carbon atoms, $R^8$ is an alkyl group having 1 to 20 carbon atoms, $R^9$ is an alkyl group having 1 to 20 carbon atoms which is different from $R^8$ or an alkoxyalkyl group represented by —(CH$_2$)$_k$—OR, R is a methyl group or an ethyl group; and k is 1 or 2.

2. The conductive metal paste according to claim 1, wherein the metal filler is silver.

3. The conductive metal paste according to claim 1, further comprising a binder.

4. The conductive metal paste according to claim 1, wherein an anion forming the ionic liquid is a fluorine atom-containing anion, an alkane sulfonate anion, an aromatic sulfonate anion, an alkyl sulfate anion, an alkyl phosphate anion, an alkyl phosphonate anion or a trialkylsilyl alkanesulfonate anion.

* * * * *